(12) United States Patent
Sobrino et al.

(10) Patent No.: US 12,473,994 B2
(45) Date of Patent: Nov. 18, 2025

(54) VALVE SYSTEM FOR ATEX ENVIRONMENT

(71) Applicant: ASCO SAS, Luce (FR)

(72) Inventors: Cécilio Sobrino, Montlouis sur Loire (FR); Vivek Pandurang Fale, Pune (IN); Jean-Pierre Gomez, Amilly (FR); Arnaud Peltier, Yevres (FR); Daniel Solet, Gasville-Oisème (FR)

(73) Assignee: ASCO SAS, Luce (FR)

( * ) Notice: Subject to any disclaimer, the term of this patent is extended or adjusted under 35 U.S.C. 154(b) by 67 days.

(21) Appl. No.: 18/036,655

(22) PCT Filed: Oct. 27, 2021

(86) PCT No.: PCT/EP2021/079814
§ 371 (c)(1),
(2) Date: May 12, 2023

(87) PCT Pub. No.: WO2022/101011
PCT Pub. Date: May 19, 2022

(65) Prior Publication Data
US 2024/0011579 A1    Jan. 11, 2024

(30) Foreign Application Priority Data
Nov. 13, 2020 (IN) .............................. 202021049686

(51) Int. Cl.
*F16K 41/02* (2006.01)
*F16K 1/32* (2006.01)

(52) U.S. Cl.
CPC ................ *F16K 41/02* (2013.01); *F16K 1/32* (2013.01)

(58) Field of Classification Search
CPC ........................................................ F16K 41/02
USPC .................................................. 251/214, 337
See application file for complete search history.

(56) References Cited

U.S. PATENT DOCUMENTS

| | | | | |
|---|---|---|---|---|
| 2,188,664 A | * | 1/1940 | Mochel | F16K 41/02 277/417 |
| 2,521,692 A | * | 9/1950 | Costello | F16K 41/02 277/530 |
| 3,537,682 A | * | 11/1970 | Priese | F16K 41/00 251/214 |
| 3,612,016 A | * | 10/1971 | Jelen | F01L 3/10 123/90.67 |
| 3,698,684 A | * | 10/1972 | Grenier | F16K 41/046 251/308 |
| 5,031,923 A | * | 7/1991 | Davies | F16K 41/026 277/530 |

(Continued)

FOREIGN PATENT DOCUMENTS

| | | |
|---|---|---|
| CN | 107 035 884 | 8/2017 |
| WO | 2005/002292 | 1/2005 |
| WO | 2015/072472 | 5/2015 |

OTHER PUBLICATIONS

International Search Report dated Jan. 28, 2022.

*Primary Examiner* — Kevin F Murphy
(74) *Attorney, Agent, or Firm* — IPSILON USA, LLP

(57) ABSTRACT

A valve system (1) comprising a valve having a valve stem (50), a valve body (20) and a stuffing box (30) assembled to the valve body, the valve system comprising a washer (60) in contact with the stem (50) and the stuffing box (30), the washer (60) comprising an electrically conductive material.

20 Claims, 3 Drawing Sheets

(56) References Cited

U.S. PATENT DOCUMENTS

| | | | | |
|---|---|---|---|---|
| 7,651,066 | B2* | 1/2010 | Vogel | F16K 31/122 |
| | | | | 251/63 |
| 10,167,977 | B2* | 1/2019 | Arcelaschi | F16K 5/0647 |
| 11,635,015 | B2* | 4/2023 | Stephens | F01N 3/0828 |
| | | | | 123/41.08 |
| 2013/0090004 | A1 | 4/2013 | Corbett | |
| 2014/0041938 | A1 | 2/2014 | Corbett | |
| 2019/0137001 | A1 | 5/2019 | Kirbs et al. | |

\* cited by examiner

VALVE SYSTEM FOR ATEX ENVIRONMENT

RELATED APPLICATION

This application is a National Phase of PCT/EP2021/079814 filed on Oct. 27, 2021, which claims the benefit of priority from Indian Patent Application No. 202021049686, filed on Nov. 13, 2020, the entirety of which are incorporated by reference.

FIELD OF INVENTION

The present invention is related to a valve system, in particular for use in ATEX environment.

BACKGROUND

ATEX is an abbreviation for "Atmosphere Explosible" and refers to European Directive 2014/34/EC. This directive governs the placing on the market of explosion-proof electrical and mechanical equipment, components and protective systems. One of the ATEX directives require that electrostatic discharges capable of triggering dangerous explosions must be prevented by means of appropriate measures such as proper grounding of devices.

Valve systems of existing design comprise a plunger fixed at one end to a reciprocating valve stem. The plunger comprises a PTFE disc seal configured to be in contact with a valve body when the valve is closed. The valve stem extends at the other end into a top box of the valve system. The top box commonly houses a piston and a spring for controlling the reciprocating movement of the stem. The valve commonly comprises a plastic piston and/or a piston washer in contact with a plastic stopper at the other end.

Due non-conductive parts at top & bottom, in event of charge or energy created due to impact of the plunger against its seat, there is no ground continuity available to discharge this charge to ground.

WO2015072472 discloses a valve with an antistatic function comprising a conductive thin wavy plate member mounted in an annular mounting groove provided in an axial mounting part of the valve body and/or the stem, and this plate member makes contact with the outer circumferential surface of the stem and the inner circumferential surface of the axial mounting part.

WO2005/002292 discloses an electrical grounding assembly for a control valve comprising a valve body and a valve trim electrically isolated from the valve body. The electrical grounding assembly comprises an elastic grounding connector having in combination an elastic region and an electrically conductive surface compressed between the valve body and the valve trim to form and maintain an internal electrical contact between the valve body and valve trim.

There exists a need to further improve existing valve systems and to remedy at least in part to the drawbacks mentioned above.

SUMMARY OF THE INVENTION

Exemplary embodiments of the present invention relate to a valve system comprising a valve having a valve stem, a valve body and a stuffing box assembled to the valve body, the valve system comprising a washer in contact with the stem and the stuffing box, the washer comprising an electrically conductive material.

The washer allows to ensure grounding and electrical continuity between the moving valve stem and the stuffing box.

The terms "upper" or "top", and "lower" or "bottom" refer to the relative position along a longitudinal axis of the system oriented vertically, with the stuffing box lying above the valve body.

The washer preferably comprises an annular portion and at least one flexible leg extending axially from the annular portion. The flexibility of the leg ensures positive contact with sliding stem for lifetime without adding too much friction to its movement.

Preferably, the one or more flexible legs extend axially from an inner periphery of the annular portion. The washer may comprise a plurality of flexible legs, for example four legs, equidistantly arranged on the inner periphery of the annular portion.

The flexible legs may be in contact with the valve stem. The flexible legs may have a raised edge at their free end. Preferably, the raised edges are not in contact with the valve stem. Preferably the flexible legs are in contact with the valve stem at contact points. This limits the friction between the valve stem and the washer.

The annular portion may be in contact with the stuffing box. The stuffing box may comprise a stuffing box body housing a stuffing box spring. An internal surface of the stuffing box may comprise a shoulder. The annular portion may be arranged between the shoulder and the stuffing box spring.

The stuffing box preferably comprises an electrically conductive material and the annular portion is preferably in contact with the stuffing box body which is preferably made of a metal.

The annular portion and the flexible legs are preferably integrally formed. The washer may comprise or be made of bronze or other electrically conductive alloys such as brass or copper beryllium alloy.

The stuffing box may house a stuffing box spring for applying axial force to at least one seal to cause radial expansion thereof for insuring tightness. The annular portion may be sandwiched, at least partially, between an internal surface of the stuffing box and the stuffing box spring. This allows to maintain electrical contact between the washer and the stuffing box.

Preferably, the flexible legs are not in contact with the spring.

The inner periphery of the annular portion may have a diameter that is larger than a diameter of the valve stem in a portion thereof that is received in the stuffing box. The washer may have a thickness that is constant.

Preferably, the valve is a pressure operated valve. In a variant, the valve is a solenoid valve.

The valve stem may comprise an electrically conductive material, and preferably is made of a metal, for example stainless steel.

The valve system may comprise a plastic stopper at a first end of the valve stem and a plastics material disc connected to a second end of the valve stem, for example a PTFE disc. This disc seals the valve body in a closing state of the valve system.

The valve system may comprise a top box housing a plastic piston, the valve stem extending through the piston and being attached thereto. For example, the first end of the valve stem extends into the top box. The piston defines an upper and a lower chamber of the top box. The upper chamber may house a spring configured to exert a downward force on the piston. The top box may comprise liquid or gas inlet/outlet that allows pressurization or depressurization of the respective upper and lower chamber. A pressurization of the lower chamber that biases the spring causes the upward movement of the piston and the valve stem in fixed relationship with the piston.

An external surface of the valve stem may define a shoulder, and the valve system may comprise a plastic washer arranged between the shoulder and a bottom of the piston, this plastic washer helping prevent fluid leakage between the upper and lower chambers of the top box.

Exemplary embodiments of the present invention also relate to a method for grounding a valve system of the invention, in which the valve stem is grounded only via the washer.

Exemplary embodiments of the present invention also relate to a method for manufacturing a valve system adapted for ATEX environment, comprising arranging an electrically conductive washer around the valve stem so as to obtain a valve system of the invention.

Embodiments of the invention will now be described in some further detail with reference to and as illustrated in the accompanying figures. These embodiments are illustrative only, and are not meant to be restrictive of the scope of the invention.

BRIEF DESCRIPTIONS OF THE FIGURES

DETAILED DESCRIPTIONS

Figure 1:
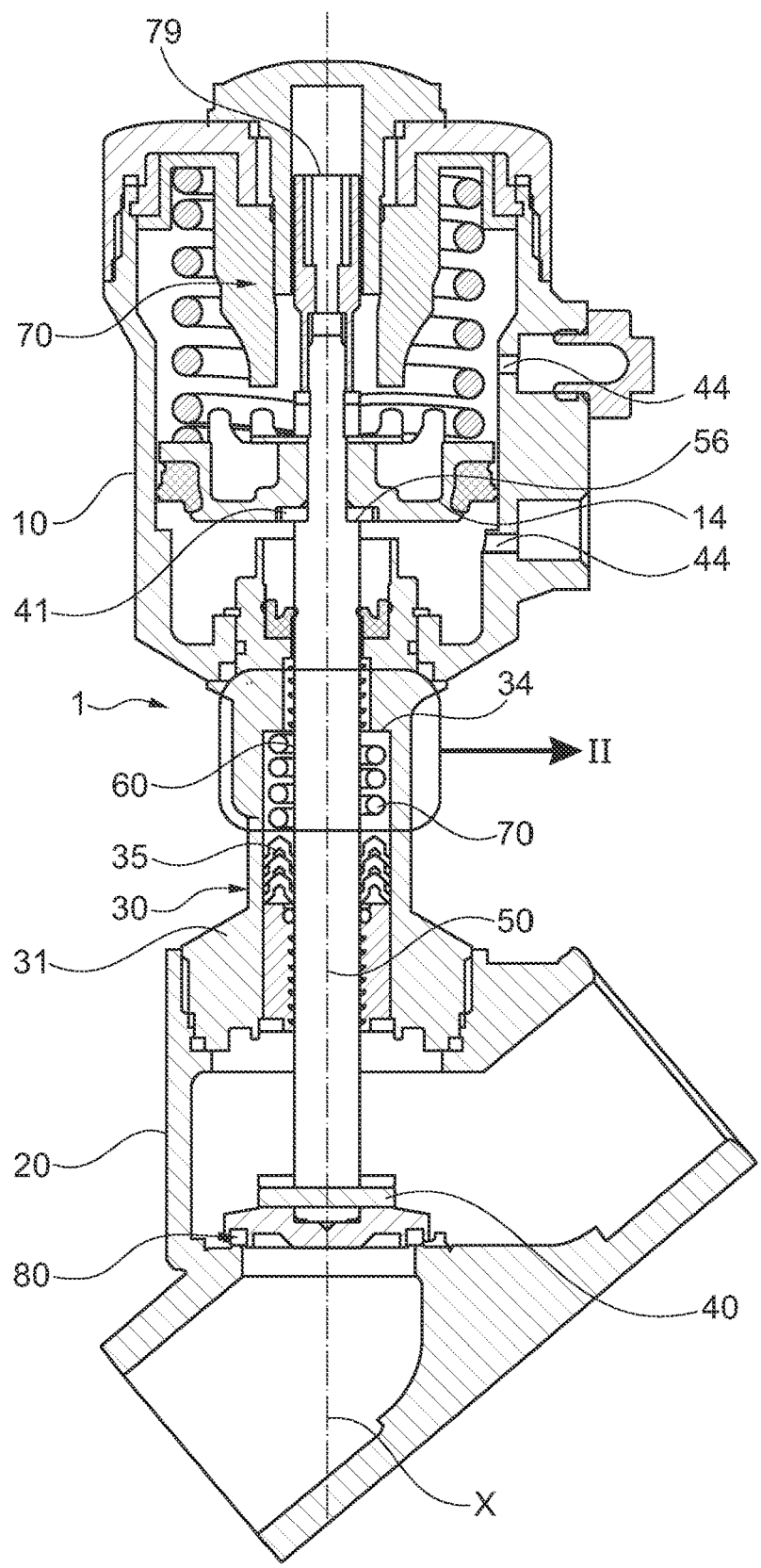
FIG. 1 is a schematic longitudinal section of a valve system according to the invention.

A valve system 1 of the invention, as shown in FIG. 1, comprises a valve body 20 and a top box 10, which houses a plastic piston 14. A valve stem 50, made of an electrically conductive material, for example stainless steel, extends through the piston 14 and is fixed thereto. The valve stem is received at a first end in a plastic stopper 79 and extends by a second end into the valve body 20. The valve system comprises a plunger 40 comprising a PTFE disc 80 connected to the second end of the valve stem 50. The disc 80 seals the valve body 20 in a closing state of the valve system.

The valve stem 50 comprise on an external surface a shoulder 56. A plastic washer 41 is arranged between the shoulder 56 and a bottom of the piston 14.

The valve system in the illustrated embodiment is a pressure operated valve and comprises two fluid inlet/outlet 44 in the top box 10. The stuffing box comprises a stuffing box body 31 housing a spring 70 and chevrons packings 35 pushed by the stuffing box spring 70. An internal surface of the stuffing box body defines a shoulder 34 facing the spring 70. The stuffing box body 31 comprises an electrically conductive material and is made for example of stainless steel.

Figure 2:
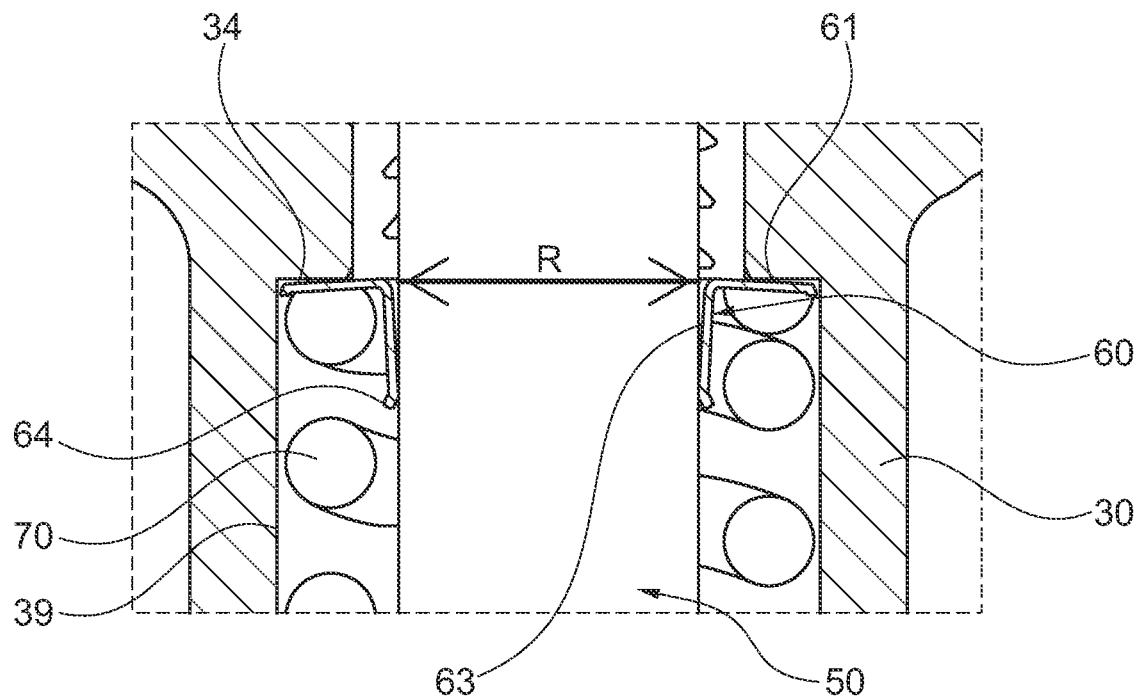
FIG. 2 is an enlarged view of circled area II of FIG. 1.

As shown in FIG. 2, the valve system 1 further comprises a washer 60 in contact with both the valve stem 50 and the stuffing box 30. The washer 60 is made of an electrically conductive material, for example brass, bronze or copper beryllium alloy.

Figure 3:
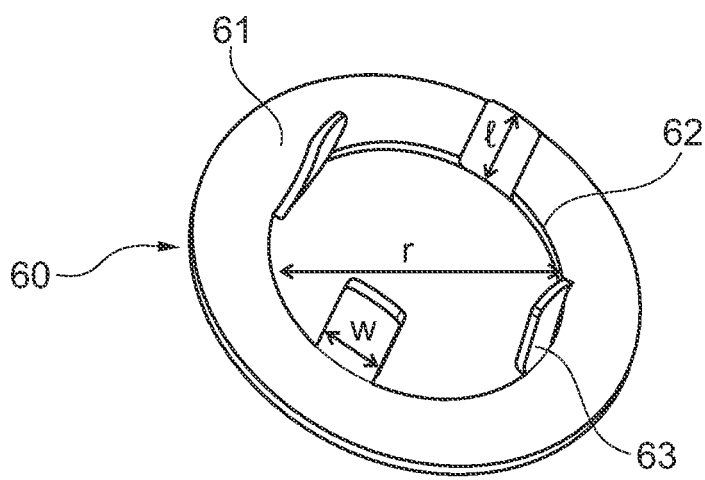
FIG. 3 is a perspective view of an example of a washer according to the invention.

As shown in FIG. 3, the washer 60 comprises an annular portion 61 and four flexible legs 63 extending axially from an inner periphery 62 of the annular portion 62. The flexible legs 63 are regularly arranged around the longitudinal axis X of the valve system.

As shown in FIG. 2, the annular portion 61 is arranged between an axial end of the spring 70 and the shoulder 34 of the stuffing box body 31. The annular portion 61 is at least partially in contact with the shoulder 34. The flexible legs 63 are arranged between the valve stem 50 and the spring 70.

Figure 4:
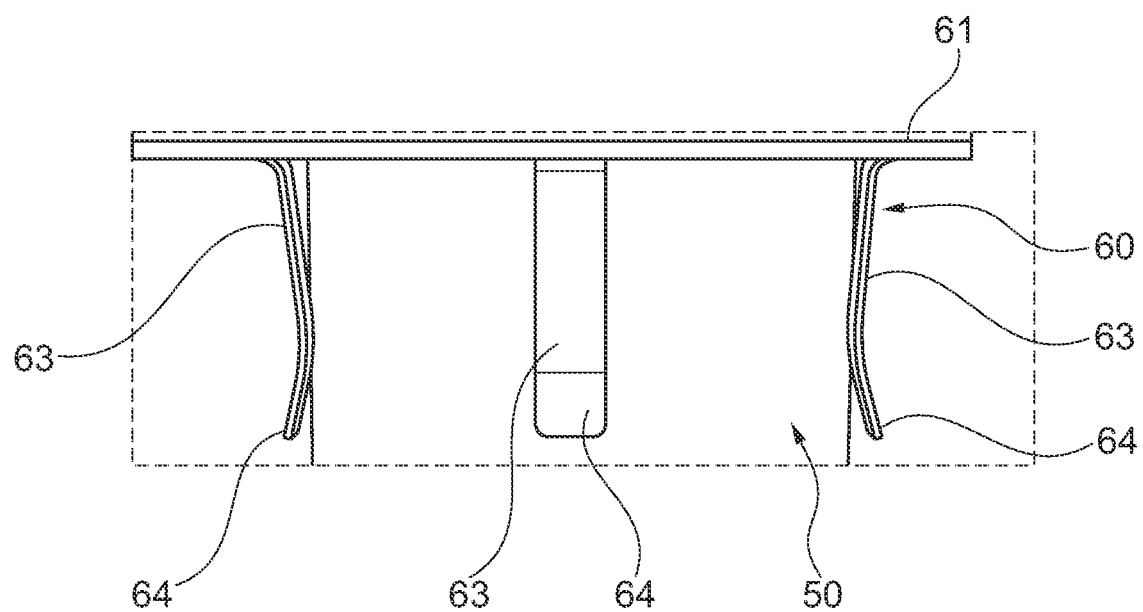
FIG. 4 is a picture showing a longitudinal sectional view of the washer parallel to a longitudinal axis of the valve system.

The flexible legs 63 bend radially inwards, as illustrated in FIG. 4. The flexible legs have a raised edge 64 that is not in contact with the valve stem 50. The flexible legs 63 are for example in contact with the valve stem 50 only by contact points.

The diameter r of the inner periphery 62 of the annular portion 61 is larger than a diameter R of the valve stem 50 in a portion of the latter received in the stuffing box 30.

The flexible legs may have a width w between 2 mm and 5 mm.

The flexible legs may have a length l between 5 mm and 15 mm.

The washer may be produced, for example by punching a sheet of metal, in order to form a piece of metal comprising an annular portion and portions that extend radially from the inner periphery of the annular portion before being bent. The radially extending portions can be bent form the flexible legs. The radially extending portions can be bent by an angle of between 60° to 80° in order to insure contact with the valve stem 50.

The orientation of the flexible legs 63 ensures contact with the valve stem 50 with reduced friction between the flexible legs 63 and the valve stem 50.

The invention is not limited to any particular top box, and various changes may be brought to the top box without departing from the scope of the invention.

The number of flexible legs 63 may be else than four.

The invention claimed is:

1. A valve system comprising a valve having a valve stem, a valve body and a stuffing box assembled to the valve body, the valve system comprising a washer in contact with the stem and the stuffing box, the washer comprising an electrically conductive material, wherein the washer comprises an annular portion and at least one flexible leg extending axially from the annular portion, the stuffing box comprising a stuffing box body, an internal surface of the stuffing box body defining a shoulder facing the valve body, the annular portion being in contact with the shoulder of the stuffing box body, wherein the stuffing box body is formed monolithically, the stuffing box body housing a stuffing box spring, the annular portion being sandwiched, at least partially, between the internal surface of the stuffing box body and the stuffing box spring.

2. A valve system comprising a valve having a valve stem, a valve body and a stuffing box assembled to the valve body, the valve system comprising a washer in contact with the stem and the stuffing box, the washer comprising an electrically conductive material, wherein the washer comprises an annular portion and at least one flexible leg extending axially from the annular portion, the stuffing box comprising a stuffing box body, an internal surface of the stuffing box body defining a shoulder facing the valve body, the annular portion being in contact with the shoulder of the stuffing box body, wherein the stuffing box comprises stuffing box packings received in the stuffing box body and the stuffing box body comprises a lateral wall surrounding the stuffing box packings, the shoulder of the stuffing box body being formed monolithically with the lateral wall of the stuffing box body.

3. A valve system comprising a valve having a valve stem, a valve body and a stuffing box assembled to the valve body, the valve system comprising a washer in contact with the stem and the stuffing box, the washer comprising an electrically conductive material, wherein the washer comprises an annular portion and a plurality of flexible legs extending axially from the annular portion, wherein the flexible legs are arranged on the inner periphery of the annular portion.

4. The valve system of claim 3, the plurality of flexible legs extending axially from an inner periphery of the annular portion.

5. The valve system of claim 4, the plurality of flexible legs comprising four flexible legs equidistantly arranged on the inner periphery of the annular portion.

6. The valve system of claim 4, the inner periphery of the annular portion having a diameter larger than a diameter of the valve stem in a portion thereof received in the stuffing box.

7. The valve system of claim 3, the annular portion and the plurality of flexible legs being integrally formed.

8. The valve system of claim 7, wherein the annular portion and the plurality of flexible legs comprising bronze, brass or copper beryllium alloy.

9. The valve system of claim 3, the plurality of flexible legs being in contact with the valve stem and the annular portion being in contact with the stuffing box.

10. The valve system of claim 3, the plurality of flexible legs having raised edges not in contact with the valve stem.

11. The valve system of claim 10, wherein the plurality of flexible legs is in isolated contact with the valve stem.

12. The valve system of claim 3, wherein the stuffing box body houses a stuffing box spring, the annular portion being sandwiched, at least partially, between an internal surface of the stuffing box body and the stuffing box spring.

13. The valve system of claim 3, the valve stem comprising an electrically conductive material.

14. The valve system of claim 3, comprising a plastic stopper at a first end of the valve stem and a plastic material disc connected to a second end of the valve stem.

15. The valve system of claim 3, comprising a top box housing a plastic piston, the valve stem extending through the piston.

16. The valve system of claim 3, an external surface of the valve stem defining a shoulder, the valve system comprising a plastic washer arranged between the shoulder and a bottom of a piston.

17. A method for grounding a valve system of claim 3, in which the valve stem is grounded only via the washer.

18. A method for manufacturing a valve system adapted for ATEX environment, comprising arranging an electrically conductive washer around a valve stem so as to obtain a valve system according to claim 3.

19. A valve system as claimed in claim 3, wherein said valve system is configured for use in an ATEX environment.

20. The valve system of claim 3, wherein the flexible legs are equidistantly arranged on the inner periphery of the annular portion.

\* \* \* \* \*